R. H. BOWEN.
RIM CLAMP FOR PULLEYS.
APPLICATION FILED FEB. 21, 1914.
1,142,749.
Patented June 8, 1915.
2 SHEETS—SHEET 1.
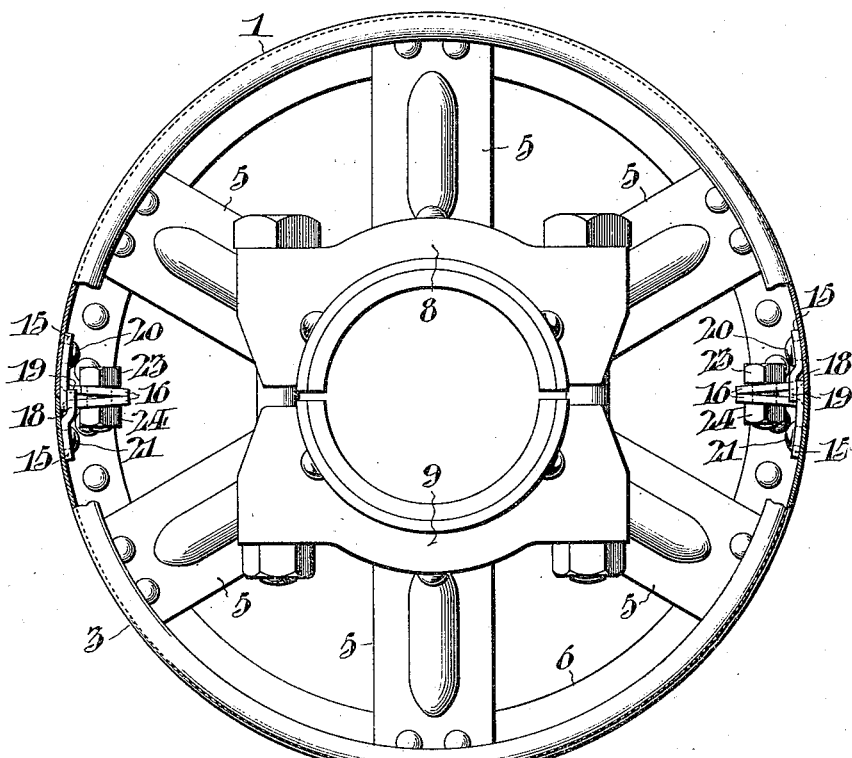
FIG. I.
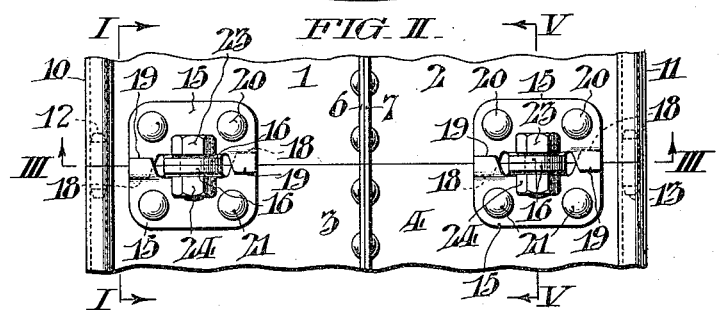
FIG. II.
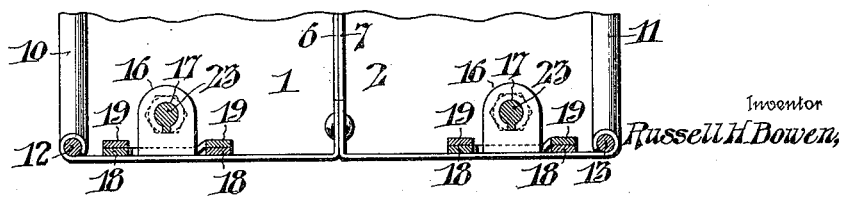
FIG. III.
Inventor
Russell H. Bowen,
Witnesses R. H. BOWEN.
RIM CLAMP FOR PULLEYS.
APPLICATION FILED FEB. 21, 1914.
1,142,749.
Patented June 8, 1915.
2 SHEETS—SHEET 2.
FIG. IV.
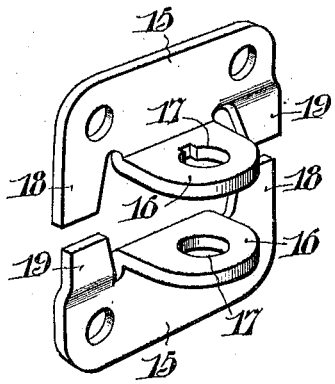
FIG. V.
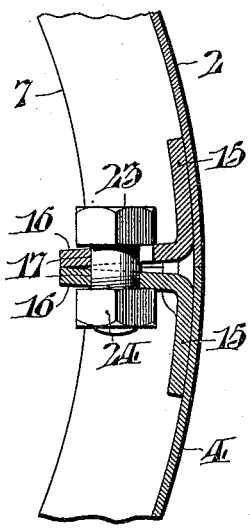
Inventor
Russell H. Bowen,

UNITED STATES PATENT OFFICE.

RUSSELL H. BOWEN, OF PHILADELPHIA, PENNSYLVANIA, ASSIGNOR TO THE AMERICAN PULLEY COMPANY, OF PHILADELPHIA, PENNSYLVANIA, A CORPORATION OF PENNSYLVANIA.

RIM-CLAMP FOR PULLEYS.

1,142,749.   Specification of Letters Patent.   Patented June 8, 1915.

Application filed February 21, 1914. Serial No. 820,138.

*To all whom it may concern:*

Be it known that I, RUSSELL H. BOWEN, of Philadelphia, in the county of Philadelphia and State of Pennsylvania, have invented certain new and useful Improvements in Rim-Clamps for Pulleys, whereof the following is a specification, reference being had to the accompanying drawings.

My invention relates to a so-called split pulley, and is particularly adapted for use in connection with pulleys of that type when made from pressed sheet steel.

In the accompanying drawings I have illustrated the invention as embodied in one variety of this general class, but it will be understood that it is not restricted to this particular form.

In said drawings Figure I, represents a view, partly in side elevation and partly in localized sections at right angles to the axis, of a split pulley embodying my invention. The portions in section are indicated by line 1—1 in Fig. II. Fig. II, is a partial view, in elevation, of the interior of the pulley rim, at the region which is adjacent to the meeting edges of the two halves of the pulley, at one diametrical extremity of the line of their division. Fig. III, is a partial transverse section on the line III, III, of Fig. II, which line coincides with that of the meeting edges. Fig. IV, is a view in perspective, and on an enlarged scale, showing the details of the pair of members which together constitute each clamping device, the parts being represented as separated, but in positions which indicate their general relations to one another. Fig. V, is a partial sectional view, also on an enlarged scale, on the line V, V, of Fig. II.

In pulleys of the class to which my invention is especially adapted, the edges of the rim usually meet at points equidistant between two spokes and the edges are, therefore, not directly supported against radial displacement relatively to one another, except by such local restraint as is afforded by dowel pins inserted in the side fillets, and by the securing bolts which pass through the rim clamps, and which, however, may have some play in the bolt holes.

The object of the present invention is to provide rim clamps which shall afford an extended and direct support or supports, against radial displacement of the rim at its meeting edges, and which shall be simple in construction, and easy of application.

The particular type of pulley, which I have selected for illustration in the accompanying drawings, is one in which each half of the rim is made of a pair of semi-annular bands, having inwardly projecting radial flanges along their adjacent sides, to which flanges the spokes are secured, but it will be understood, as previously stated, that the invention is not limited to this particular embodiment.

Referring now to the drawings, 1, and 2, (Fig. II) represent the two rim-bands of one half of the pulley, and 3, and 4, the corresponding rim-bands of the other half. The flanges 6, and 7, of the respective rim-bands, are united to one another, and to the spokes 5, by rivets in the usual manner, the inner ends of the spokes being connected to the hub clamps 8, and 9, whose construction and mode of operation is well understood, and need not be described in detail. The outer sides of the rim-bands 1, and 2, are preferably provided with fillets 10, and 11, respectively, in which may be seated the dowel pins 12, and 13, (shown in dotted lines in Fig. II), at the meeting edges of the respective half pulleys.

The rim clamps, which constitute the salient features of the present invention, are, in this instance, four in number, there being two sets of clamping devices at each diametrical extremity. Each clamping device is a two-part structure comprising a pair of preferably similar elements, whose positions, when mounted, are reversed with relation to one another. Referring to Fig. IV, which shows the details thereof, it will be noted that each member of the pair comprises a base-plate 15, slightly curved to conform to the curvature of the pulley rim, and having a central raised upright 16, whose general plane is approximately radial to the axis of the pulley, said upright being provided with a hole 17, to permit the passage of the securing bolt. The base-plate 15, is extended laterally at each side of the upright 16, and provided with projections as shown at 18, and 19, respectively, which extend circumferentially across the line of meeting edges of the pulley halves. The projection at 18, lies in the same general plane as the plate itself, but the projection 19, though lying in a general plane substantially parallel thereto, is raised inwardly to a distance corresponding to its own thickness. Thus, when the two elements, constituting a pair, are reversed in position relatively to one another, as shown, one of the raised projections 18, will be in the proper plane to engage snugly beneath the projection 19, of the other member, and vice versa. The base-plates 15, of the pair are respectively attached to opposite halves of the pulley, at points adjacent to the meeting edges, by means of rivets such as 20, and 21, the relative positions being such that when the edges of the two halves of the pulley are brought together and secured by means of the bolts 23, passing through the holes 17, of the uprights 16, and nuts 24, the projections 18, and 19, will interlock with one another, and thus directly prevent any radial displacement whatever throughout the region of engagement.

I prefer to apply the rim clamps to the rim in the relation indicated in Figs. I and V, where it will be noted that although the meeting edges of the pulley rim abut in close contact, the proximate faces of the uprights 16, are only in contact with one another at the region adjacent to their inner extremities. This detail of organization facilitates the drawing together of the pulley halves and insures proper meeting of the rim edges.

It will be noted that the clamping devices can readily be stamped from sheet metal, and as they are identical, the number of parts required is minimized.

Having thus described my invention, I wish it to be understood that I do not broadly claim the use of rim-clamps having base plates adapted to be attached to the rim, and raised uprights adapted to be secured together by means of clamping bolts, as I am aware that such devices have heretofore been used, and it is the purpose of the present invention to avoid the defects of that type of rim clamp.

I claim:

1. The combination with a split pulley, of a rim-clamp, comprising two similar parts, each of which contains a base plate adapted to be secured to the pulley rim; an upright extending inwardly from said base plate; lateral projections arranged at the respective sides of said upright and extended circumferentially across the line of meeting edges of the pulley halves, one of said projections lying in the general plane of the base plate, the other of said projections lying in a general plane substantially parallel thereto, but raised inwardly to an extent substantially equal to the thickness of the opposite projection.

2. The combination with a split pulley, of a rim-clamp comprising two similar parts, each of which contains a base plate adapted to be secured to the pulley rim, an upright extending inwardly from the base plate, said uprights being adapted to be placed face to face, and clamping means for securing said uprights together, each base plate having lateral projections arranged at the respective sides of said upright and extending circumferentially across the line of the meeting edges of the pulley halves, one of said projections lying in the general plane of the base plate and adapted to extend under the opposed projection on the other base plate, said opposed projection being raised inwardly to an extent substantially equal to the thickness of the opposite projection, the other projection on said first named base plate being raised inwardly to an extent substantially equal to the thickness of the opposite projection and projecting over the same, said opposite projection lying in the general plane of the base plate, whereby said parts of the rim clamp are interchangeable securing the halves of the pulley together and preventing radial displacement of one rim section relative to the other.

In testimony whereof, I have hereunto signed my name at Philadelphia, Pennsylvania, this nineteenth day of February, 1914.

RUSSELL H. BOWEN.

Witnesses:
JAMES H. BELL,
E. L. FULLERTON.

Copies of this patent may be obtained for five cents each, by addressing the "Commissioner of Patents, Washington, D. C."